(12) United States Patent
Simske et al.

(10) Patent No.: US 9,305,157 B2
(45) Date of Patent: Apr. 5, 2016

(54) AUTHENTICATION TARGET HAVING AMBIGUOUS TARGET ELEMENTS

(75) Inventors: Steven J. Simske, Fort Collins, CO (US); Jason S. Aronoff, Fort Collins, CO (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 2611 days.

(21) Appl. No.: 11/467,539

(22) Filed: Aug. 25, 2006

(65) Prior Publication Data

US 2008/0052529 A1    Feb. 28, 2008

(51) Int. Cl.
*H04L 9/00* (2006.01)
*G06F 21/36* (2013.01)

(52) U.S. Cl.
CPC ..................................... *G06F 21/36* (2013.01)

(58) Field of Classification Search
USPC ......... 726/17, 4.2, 34, 22; 709/223, 229, 238; 713/170, 189, 187, 188; 380/255, 229, 380/232, 239; 707/200, 204, 100
See application file for complete search history.

(56) References Cited

U.S. PATENT DOCUMENTS

| 3,743,427 | A | 7/1973 | Weiser |
| 5,629,766 | A | 5/1997 | Kaplan |
| 5,818,572 | A | 10/1998 | Pappas |
| 6,577,336 | B2 | 6/2003 | Safai |
| 6,925,192 | B2 | 8/2005 | Honsinger |
| 7,067,824 | B2 | 6/2006 | Muller |
| 2003/0035564 | A1* | 2/2003 | Honsinger et al. ............ 382/100 |
| 2003/0128375 | A1* | 7/2003 | Ruhl et al. ..................... 358/1.6 |
| 2003/0156733 | A1 | 8/2003 | Zeller |
| 2006/0171559 | A1* | 8/2006 | Rhoads ......................... 382/100 |
| 2007/0029394 | A1 | 2/2007 | Wicker et al. |
| 2007/0086070 | A1 | 4/2007 | Wicker |
| 2008/0043273 | A1 | 2/2008 | Simske et al. |

* cited by examiner

*Primary Examiner* — Jeffrey Pwu
*Assistant Examiner* — Nega Woldemariam
(74) *Attorney, Agent, or Firm* — Law Offices of Michael Dryja

(57) ABSTRACT

A reading device reads ambiguous target elements of an authentication target printed on a medium. Each ambiguous target element has a number of different manners by which the ambiguous target element can be interpreted by the reading device. The authentication target as read by the reading device is compared against an authentication signature of the reading device. The authentication signature specifies for each ambiguous target element an expected manner by which the reading device interprets the ambiguous target element as one of the different manners by which the ambiguous target element can be interpreted. Where the authentication target as read by the reading device matches the authentication signature of the reading device, the reading device is signaled as having passed authentication.

20 Claims, 7 Drawing Sheets

FIG 2A

⌇202           ⌇204           ⌇206
A = {A1,A2}   B = {B1,B2}   C = {C1,C2}     POSSIBLE AMBIGUOUS TARGET ELEMENT VALUES

FIG 2B

⌇208
{A1,B1,B2,C2,A2,C1} =   AMBIGUOUS TARGET ELEMENTS OF AUTHENTICATION TARGET AS PRINTED ON PRINTING MEDIUM

FIG 2C

⌇210
{I2,I1,I2,I1,I1,I2} =   AUTHENTICATION SIGNATURE

FIG 2D

⌇212                    ⌇214
I1         ⟶         {I1,I1,I1,I1,I1,I1}
AUTHENTICATION          AUTHENTICATION
FINGERPRINT             SIGNATURE (IMPLICIT)

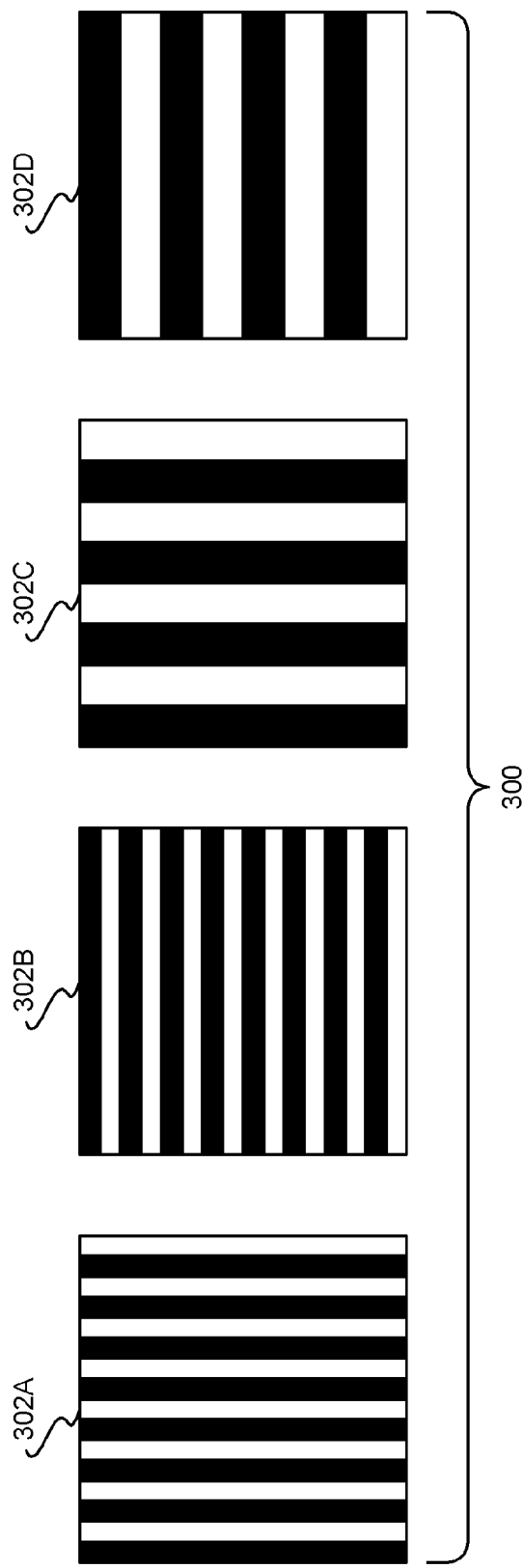

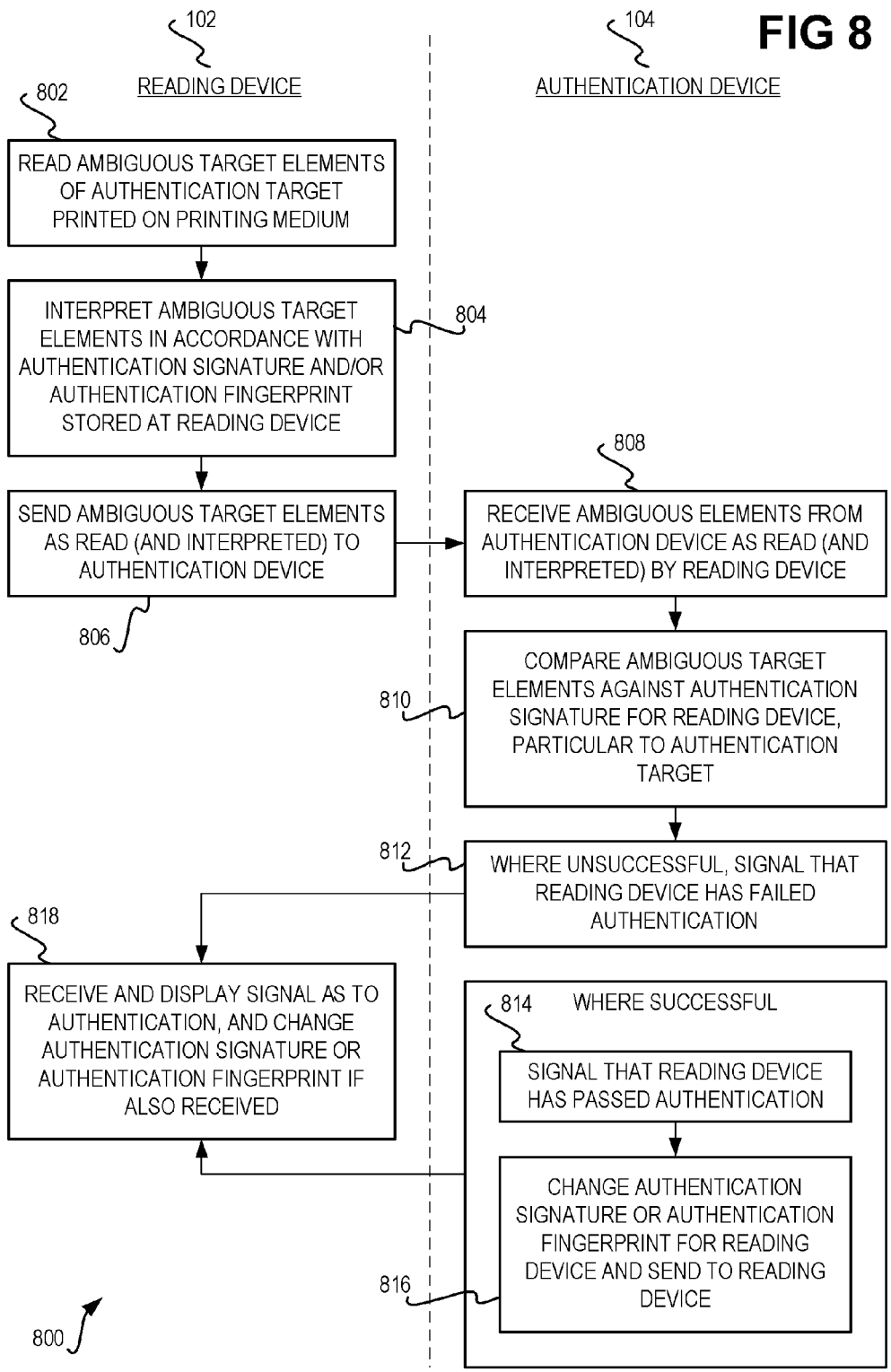

AUTHENTICATION TARGET HAVING AMBIGUOUS TARGET ELEMENTS

BACKGROUND

Authentication is the process of determining whether a given device or other entity actually originates from a putative party, such as the company that manufactures or sells the device. Authentication is useful for end users, so that they know that the devices that they have purchased actually originate from the company that made or sold the devices. Authentication is also useful as a way to restrain counterfeiters from making and/or selling counterfeit devices. Manufacturers further benefit because when end users request support or service of their devices ostensibly made by the manufacturers, the manufacturers can determine that the devices are authentic, and not counterfeit. Manufacturers also benefit from such authentication throughout the distribution or supply chain of a product from point of manufacture to point of use by an end user.

BRIEF DESCRIPTION OF THE DRAWINGS

FIGS. 2A, 2B, 2C, and 2D are diagrams of example possible ambiguous target element values, an example printed authentication target, an example explicit authentication signature, and an example authentication fingerprint and corresponding implicit authentication signature, according to a general value-based embodiment of the invention.

FIGS. 3 and 4 are diagrams of one or more sequences of modulation transfer function (MTF) target patterns that can be employed as ambiguous target elements, according to a specific value-based embodiment of the invention.

FIG. 8 is a flowchart of a method for authenticating a reading device in relation to an authentication target having a number of ambiguous target elements, according to an embodiment of the invention.

DETAILED DESCRIPTION OF THE DRAWINGS

System and Overview

In this section of the detailed description, an overview of an embodiment of the invention is presented. The embodiment is described in relation to particular types that are defined by example in subsequent sections of the detailed description. The embodiment is further described in relation to an exemplary system in relation to which embodiments of the invention may be practiced.

Figure 1:
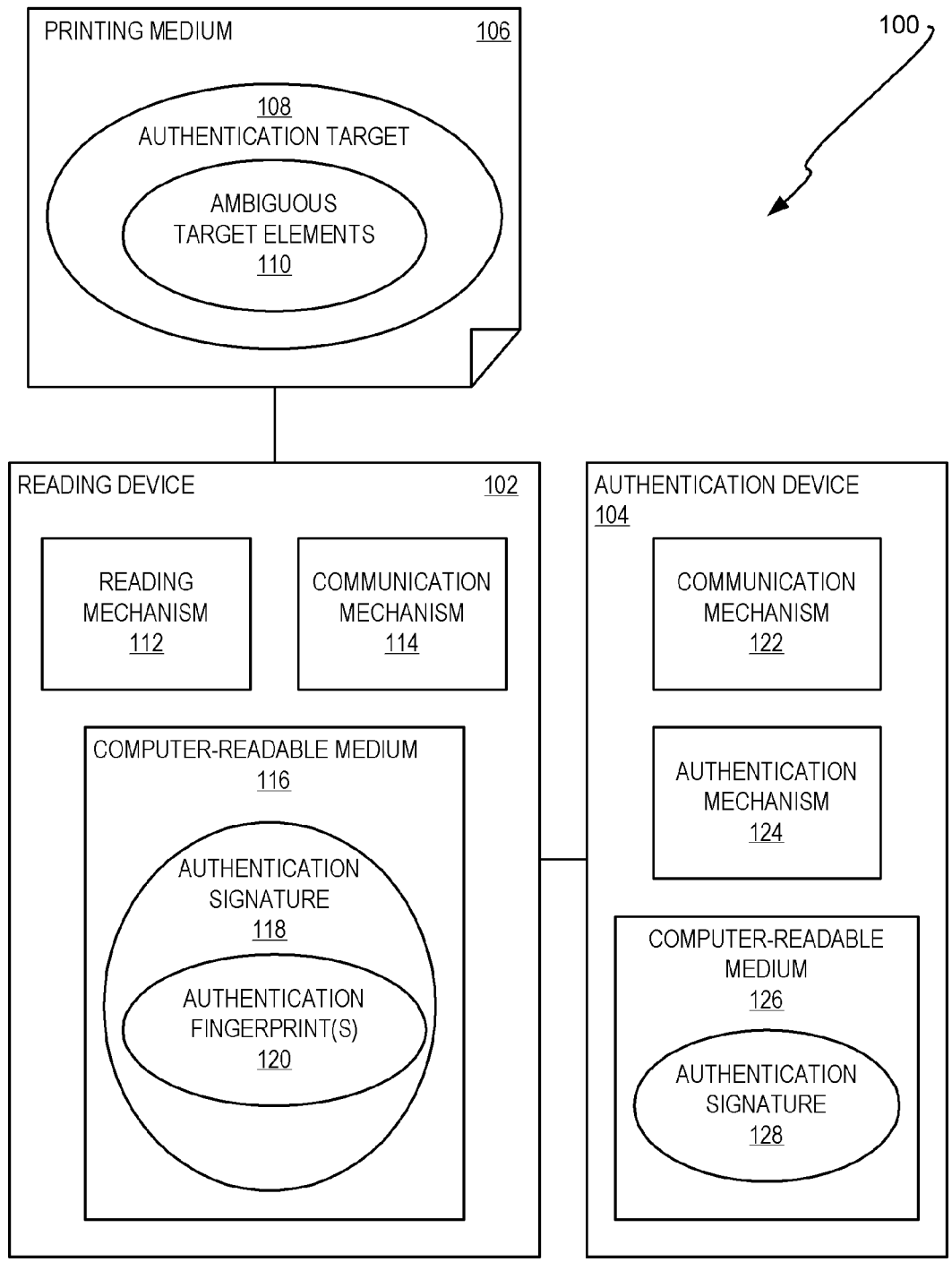
FIG. 1 is a diagram of a system in which an authentication target having ambiguous target elements can be employed, according to an embodiment of the invention.

Therefore, FIG. 1 shows a system 100, according to an embodiment of the invention. The system 100 includes a reading device 102 and an authentication device 104. In general operation, the reading device 102 reads and interprets a number of ambiguous target elements 110 of an authentication target 108 printed on a printing medium 106, such as paper or another type of printing medium. Embodiments of ambiguous target elements 110 of an authentication target 108 are presented later in the detailed description to define these terms by example. The reading device 102 passes the ambiguous target elements 110 of the authentication target 108, as have been read and thus interpreted by the device 102, to the authentication device 104. Based on the reading and interpretation of the ambiguous target elements 110 of the authentication target 108 by the reading device 102, the authentication device 104 authenticates the reading device 102.

The reading device 102 includes a reading mechanism 112, a communication mechanism 114, and a computer-readable medium 116. The reading device 102 can include other components and mechanisms, in addition to and/or in lieu of the mechanisms 112 and 114 and the medium 116, as can be appreciated by those of ordinary skill within the art. The reading device 102 may be a computing device, an image-formation device like an inkjet or a laser printer, a scanning device like an optical scanner, and/or another type of device.

The reading mechanism 112 detects the ambiguous target elements 110 of the authentication target 108 printed on the printing medium 106, and thus is that which can read and interpret the ambiguous target elements 110. The reading mechanism 112 may be an optical reading or scanning mechanism, or another type of reading mechanism. In general, the reading mechanism 112 may be implemented in hardware, or in a combination of hardware and software. It is said that each of the ambiguous target elements 110 has a number of different manners, or ways, by which the ambiguous target element can be interpreted by the reading mechanism 112. Embodiments of such different manners by which the ambiguous target elements 110 can be interpreted are presented later in the detailed description to define these phrases by example.

The communication mechanism 114 communicates data representing the ambiguous target elements 110 of the authentication target 108 as read and interpreted by the reading device 102 to the authentication device 104. The communication mechanism 114 also receives from the authentication device 104 whether the reading device 104 has passed or failed authentication based on the reported ambiguous target elements 110. The communication mechanism 114 may be a wired and/or wireless network adapter mechanism for communicating with the authentication device 104 via a wired and/or wireless network, or a direct wireless mechanism, such as a Bluetooth mechanism, for direct wireless communication with the authentication device 104. The communication mechanism 114 may alternatively be a direct wired mechanism, such as a serial port mechanism or a Universal Serial Bus (USB) mechanism, for direct wired communication with the authentication device 10, or another type of communication mechanism. In general, the communication mechanism 114 may be implemented in hardware, or in a combination of hardware and software.

The computer-readable medium 116 may be a volatile and/or a non-volatile storage, such as semiconductor memory like dynamic random-access memory (DRAM), flash memory, a hard disk drive, or another type of tangible computer-readable medium. The computer-readable medium 116 stores data representing an authentication signature 118 of the reading device 102. The authentication signature 118 includes one or more authentication fingerprints 120.

An authentication fingerprint 120 specifies a particular manner by which an encountered ambiguous target element of the ambiguous target elements 110 is to be interpreted by the reading device 102. For example, each of the ambiguous target elements 110 may be one of {a, b, c, d}. A corresponding example of the authentication fingerprint 120 may thus be specified as iabcd_1, where iabcd_1 is a particular manner by which any of the elements a, b, c, and d can be interpreted. For instance, the authentication fingerprint 120 iabcd_1 may in one embodiment include {ia_1, ib_1, ic_1, id_1}, where ia_1 is a particular manner by which the element a can be interpreted, ib_1 is a particular manner by which the element b can be interpreted, and so on. The authentication fingerprint 120 thus can be considered as a specification of the manner by which any presented ambiguous target element is to be (or is expected to be) particularly interpreted.

In one embodiment, the authentication signature 118 is a sequence of a number of authentication fingerprints 120 corresponding to the sequence of the ambiguous target elements 110 of the authentication target 108. If the authentication target 108 includes ambiguous target elements 110 {ate1, ate2, ..., ateN}, then the authentication signature 118 may include authentication fingerprints 120 {fp1, fp2, ..., fpN}, where the fingerprint fpX specifies the particular manner by which the ambiguous target element atX is to be interpreted. As such, the authentication signature 118 can specify different manners by which different ambiguous target elements are to be interpreted.

For example, for a specific sequence of ambiguous target elements 110 {a, b, b, d, c}, the associated authentication signature 118 may be {iabcd_1, iabcd_1, iabcd_2, iabcd_3, iabcd_2}. This means that the first element, equal to a, is interpreted by the manner specified by the authentication fingerprint iabcd_1. The second element, equal to b, is interpreted by the manner specified by the same authentication fingerprint iabcd_1. However, the third element, also equal to b, is interpreted by the manner specified by a different fingerprint iabcd_2. Each element of the authentication signature 118 thus can be considered as a specification of the manner by which a corresponding ambiguous target element is to be (or is to expected to be) particularly interpreted.

In another embodiment, however, there may just be one authentication fingerprint 120 within the authentication signature 118. In this situation, the authentication signature 118 is simply a sequence of instances of the same authentication fingerprint 120. That is, for a given sequence of ambiguous target elements 110, each of the ambiguous target elements 110 is interpreted by the same authentication fingerprint 120.

For example, for the sequence of the ambiguous target elements 110 {a, b, b, d, c}, where there is one authentication fingerprint 120 iabcd_1, each ambiguous target element of the sequence is interpreted in accordance with iabcd_1. Thus, the authentication signature 118 is a sequence of instances {iabcd_1, iabcd_1, iabcd_1, iabcd_1, iabcd_1}. This is because each of the ambiguous target elements a, b, b, d, and c of the sequence {a, b, b, d, c} is interpreted in accordance with the same authentication fingerprint iabcd_1.

The reading device 102 thus reads and interprets the ambiguous target elements 110 of the authentication target 108 printed on the printing medium 106, in accordance with the authentication signature 118. In one embodiment, the reading mechanism 112 inherently interprets the ambiguous target elements 110 in accordance with the authentication signature 118 during the process of reading the elements 110. In another embodiment, the reading mechanism 112 reads the ambiguous target elements 110, and then the same or a different mechanism of the reading device 102 interprets the elements 110 in accordance with the authentication signature 118. However, as used herein, the terms reading and interpreting are employed substantially synonymously, in that, for instance, it is presumed that the reading device 102 reading the ambiguous target elements 110 means that the elements 110 are interpreted in accordance with the authentication signature 118.

The authentication device 104 includes a communication mechanism 122, an authentication mechanism 124, and a computer-readable medium 126. The authentication device 102 can include other components and mechanisms, in addition to and/or in lieu of the mechanisms 122 and 14 and the medium 126, as can be appreciated by those of ordinary skill within the art. The authentication device 104 may be a computing device, such as a server, a laptop, and/or a desktop computer, or another type of authentication device.

The communication mechanism 122 receives from the reading device 102 data representing the ambiguous target elements 110 of the authentication target 108 as read and interpreted by the reading device 102. The communication mechanism 122 further sends to the reading device 102 whether the reading device 102 has passed or failed authentication, based on the ambiguous target elements 110 reported by the reading device 102. As with the communication mechanism 122 of the reading device 102, the communication mechanism 122 of the authentication device 104 may be a wired and/or wireless network adapter mechanism for communicating with the authentication device 104 via a wired and/or wireless network, or a direct wireless mechanism, such as a Bluetooth mechanism, for direct wireless communication with the reading device 102. The communication mechanism 122 may alternatively be a direct wired mechanism, such as a serial port mechanism or a Universal Serial Bus (USB) mechanism, for direct wired communication with the authentication device 10, or another type of communication mechanism. In general, the communication mechanism 122 may be implemented in hardware, or in a combination of hardware and software.

The computer-readable medium 126 may be a volatile and/or a non-volatile storage, such as semiconductor memory like dynamic random-access memory (DRAM), flash memory, a hard disk drive, or another type of tangible computer-readable medium. The computer-readable medium 126 stores data representing an authentication signature 128 of the reading device 102. The authentication signature 128 specifies the expected manner, or way, by which the reading device 102 is to read and interpret each of the ambiguous target elements 110, as one of the different manners by which the ambiguous target element in question can be interpreted.

The authentication signature 128 stored at the authentication device 104 differs from the authentication signature 118 stored at the reading device 102 as follows. The authentication signature 118 is the actual manner by which the reading device 102 reads and interprets each of the ambiguous target elements 110 of the authentication target 108, whereas the authentication signature 128 is the expected manner by which the reading device 102 is to read and interpret each of the ambiguous target elements 110. Where the reading device 102 is authentic, and not counterfeit, the authentication signatures 118 and 128 are identical.

Thus, the reading device 102 reads the authentication target 108 in accordance with its authentication signature 118, and passes the target 108, as read, to the authentication device 104. The authentication device 104 in turn compares the authentication target 108 to the authentication signature 128. If the authentication target 108 matches the authentication signature 128, then this means that the reading device 102 properly read the authentication target 108, such that the authentication signature 118 at the reading device 102 is correct. Therefore, the reading device 102 is successfully authenticated, and passes authentication. By comparison, if the authentication target 108 does not match the authentication signature 128, then this means that the reading device 102 did not properly read the authentication target 108, such that the authentication signature 118 at the reading device 102 may not be correct. Therefore, the reading device 102 is not successfully authenticated, and fails authentication.

This authentication functionality of the authentication device 104 is performed by the authentication mechanism 124 of the authentication device 104. The authentication mechanism 124 may be implemented in software such as by one or more computer programs. Alternatively, the authentication mechanism 124 may be implemented in hardware. The authentication mechanism 124 may further be implemented in a combination of software and hardware.

In the following sections of the detailed description, specific embodiments of authentication signatures and/or authentication fingerprints are described. These embodiments are more detailed then the general description of such signatures and fingerprints described in this section of the detailed description. Such embodiments include a value-based embodiment, a mean transfer function (MTF) embodiment, an axis-based embodiment, and a color axis embodiment.

Value-based Embodiment in General

In this section of the detailed description, what is referred to as a value-based embodiment of the invention is described generally. A value-based embodiment of the invention employs ambiguous target elements that each has multiple values. The multiple values of a given ambiguous target element correspond to the different manners by which the element can be interpreted, as one way to define the term "ambiguous target element" and the phrase "different manners by which an ambiguous target element can be interpreted."

FIGS. 2A, 2B, 2C, and 2D show possible ambiguous target element values, an example authentication target printed on a printing medium, an example explicit authentication signature, and an example authentication fingerprint, respectively, according to a value-based embodiment. In FIG. 2A, three types of ambiguous target elements 202, 204, and 206 are depicted, corresponding to the ambiguous target element types A, B, and C, respectively. Each of these ambiguous target elements is ambiguous, in that an instance of each element can take on, or be printed at, one of two different values. Thus, an ambiguous target element of type A can have the value A1 or A2, an element of type B can have the value B1 or B2, and an element of type C can have the value C1 or C2. The different multiple values of an ambiguous target element correspond to the different manners by which the element can be interpreted in this value-based embodiment of the invention.

In general, the ambiguous target elements of each type are grouped or clustered together as compared to target elements of a different type. For instance, ambiguous target elements of type A may have values A1 and A2 that are closer to one another than to the values B1 and B2 of ambiguous target elements of type B, and than to the values C1 and C2 of ambiguous target elements of type C. For example, the values A1, A2, B1, B2, C1, and C2 may be 1, 2, 5, 6, 9, and 10, where the values A1 and A2 are numerically closer to one another than they are to either the values B1, B2, C1, and C2, and so on.

FIG. 2B shows an example authentication target 208 that may be printed on a printing medium. The authentication target 208 includes a sequence of ambiguous target elements {A, B, B, C, A, C}. FIG. 2B specifically depicts these ambiguous target elements being particularly printed at the values {A1, B1, B2, C2, A2, C1}.

FIG. 2C shows an example authentication signature 210 by which the authentication target 208 is interpreted by the reading device 102. The authentication signature 210 includes a sequence of two authentication fingerprints I1 and I2, as {I2, I1, I2, I1, I1, I2}. Thus, the authentication signature 210 specifies a sequence of the manner by which the ambiguous target elements of the authentication target 208 are to be interpreted.

For example, the authentication fingerprint I1 may specify that the ambiguous target elements A, B, and C are to be interpreted as the values A2, B1, and C1, whereas the authentication fingerprint I2 may specify that the ambiguous target elements A, B, and C are to be interpreted as the values A2, B2, and C2. Therefore, the authentication signature 210 in effect specifies an interpreted, or "read", value for each ambiguous target element as one of the values at which the ambiguous target element values can be printed. Such specification of a value for each ambiguous target element corresponds to the authentication signature 210 specifying a particular manner, or authentication fingerprint, by which each ambiguous target element is interpreted.

Thus, in FIG. 2C, the first instance of the ambiguous target element A of the authentication target 208 is interpreted as the value A2, consistent with its corresponding authentication fingerprint I2 within the authentication signature 210, even though it is printed as the value A1 in FIG. 2B. By comparison, the first instance of the ambiguous target element B of the authentication target 208 is interpreted as the value B1, consistent with its corresponding authentication fingerprint I1 within the authentication signature 210, and is also printed as the value B1 in FIG. 2B. However, the second instance of the element B of the target 208 is interpreted as the value B2, consistent with its corresponding authentication fingerprint I2 within the authentication signature 210, even though it is printed as the value B1 in FIG. 2B, and so on. Therefore, even though the authentication target 208 of FIG. 2B specifies a sequence of ambiguous target elements printed at values {A1, B1, B2, C2, A2, C1}, the reading device 102 ultimately reads and interprets this sequence as {A2, B1, B2, C1, A2, C2} in accordance with the sequence of authentication fingerprints {I2, I1, I2, I1, I1, I2} of the authentication signature 210.

The reading device 102 thus passes the authentication target 208 of FIG. 2B as read and interpreted to the authentication device 104, as the sequence {A2, B1, B2, C1, A2, C2}. The authentication device 104 compares this sequence to the authentication signature 128 stored at the device 104 itself. If the sequence matches the authentication signature 128, then authentication of the reading device 102 passes. Otherwise, authentication of the reading device 102 fails.

FIG. 2D shows an example in which just one authentication fingerprint 212 of an authentication signature 214, such that the authentication signature 214 is a sequence of instances of the same authentication fingerprint 212. The authentication fingerprint 212 specifies a value by which each unique ambiguous target element is to be interpreted. That is, the authentication fingerprint 212 specifies a value for each different ambiguous target element type. Any time an ambiguous target element is read, the target element is interpreted with the value as specified by the authentication fingerprint 212, regardless of the value at which the element is printed. More specifically, the authentication fingerprint 212 specifies the authentication fingerprint I1, which may specify that the ambiguous target elements A, B, and C are to be interpreted as the values A2, B1, and C1. Therefore, each time the reading device 102 reads the ambiguous target element A, regardless of whether this element is printed at the value A1 or A2, the device 102 interprets the element as having the value A2. Similarly, each time the reading device 102 reads the ambiguous target element B, regardless of whether this element is printed at the value B1 or B2, the device 102 interprets the element as having the value B1. Likewise, each time the reading device 102 reads the ambiguous element C, regardless of whether this element is printed at the value C1 or C2, the device 102 interprets the element as having the value C1.

The authentication signature 214 for the authentication target 208 of FIG. 2B that includes just the authentication fingerprint 212 is thus {I1, I1, I1, I1, I1, I1}, such that the authentication fingerprint 212 is static in that the authentication signature 214 includes instances of just the fingerprint 212. Therefore, even though the authentication target 208 of FIG. 2B specifies a sequence of ambiguous target elements printed at values {A1, B1, B2, C2, A2, C1}, the reading device 102 reads and interprets this sequence as {A2, B1, B1, C1, A2, C1}, in accordance with authentication signature 214 being a sequence of instances of the same authentication fingerprint 212. The reading device 102 passes the authentication target 208 of FIG. 2B as read and interpreted to the device 104, as the sequence {A2, B1, B1, C1, A2, C1}. The authentication device 104 compares this sequence to the authentication signature 128 stored at the device 104 itself. If the sequence matches the authentication signature 128, then authentication of the reading device 102 passes, and otherwise authentication of the reading device 102 fails.

As has been described, in the value-based embodiment of the invention, the multiple values of an ambiguous target element correspond to the different manners by which the ambiguous target element can be interpreted. Thus, an ambiguous target element having the values {0, 1} can be interpreted as the value 0 or at the value 1, regardless of the actual value at which the element is printed. That is, if the authentication signature specifies that the ambiguous target element is to be interpreted as the value 0, where the element is printed and/or read as the value 1, the element is nevertheless interpreted as the value 0, and where the element is printed and/or read as the value 0, the element is interpreted as the value 0.

Furthermore, the values of the ambiguous target element may be near one another, such that the value at which a particular instance of the ambiguous target element is printed is near the other values at which the particular instance of this element was not printed, according to a predetermined measure. For example, three ambiguous target elements may have corresponding values {0, 1}, {4, 5}, and {8, 9}, such that each of the values of a given ambiguous target element is one value away from the other value as the predetermined measure of nearness. Thus, the value 0 is one away from the value 1, and vice-versa; the value 4 is one away from the value 5, and vice-versa; and, the value 8 is one away from the value 9, and vice-versa.

In addition, the values of all the ambiguous target elements as a whole may be selected from a range of possible values, such that one or more of the possible values remain unused and thus are absent from any of the ambiguous target element values themselves. For example, the range of possible target element values may be {0, 1, . . . , 8, 9}, or all the integers from 0 through 9. Three ambiguous target elements may have corresponding values {0, 1}, {4, 5}, and {8, 9}, as before, such that the possible values {2, 3, 6, 7} remain unused and are absent from the values of the three ambiguous target elements as a whole.

The preceding example ensures that the difference between any value of the second ambiguous target element and any value of the first ambiguous target element, for instance, is greater than the difference between the two values of each of these ambiguous target element themselves. Thus, the difference between the values of any ambiguous target element is one, whereas the difference between any value of the second ambiguous target element and any value of the first ambiguous target element is three or four. Therefore there is less likelihood that the reading device 102 will incorrectly read a given target element.

For example, if the reading device 102 has precision of plus-or-minus one, then it may be read a printed ambiguous target element value of 1 as 0, 1, or 2. If the reading device 102 reads the value as 0, this value still corresponds to the same first ambiguous target element, which can have a value of 0 or 1. If the reading device 102 reads the value as 2, the reading device 102 knows this value is incorrect, since it is not found within the values of any of the ambiguous target elements. However, because the value of 2 is closer to the value of the ambiguous target element that can have a value of 0 or 1 than to the value of the ambiguous target element that can have a value of 4 or 5, the reading device 102 can properly conclude that the former ambiguous target element has been read, and not the latter.

Specific Value-based Embodiment Using MTF Target Patterns

In this section of the detailed description, exemplary modulation transfer function (MTF) target patterns are described. A number of these MTF target patterns can be employed as the ambiguous target elements of an authentication target in the value-based embodiment that has been described. The MTF target pattern embodiment is particularly useful, because MTF target patterns can be used for quality assurance purposes as well as authentication purposes, as will be described.

FIG. 3 shows an exemplary sequence 300 of MTF target patterns 302A, 302B, 302C, and 302D, collectively referred to as the MTF target patterns 302, according to an embodiment of the invention. Each of the MTF target patterns 302 is a series of black-and-white parallel straight lines, or bars. Within a given MTF target pattern, the black lines and the white lines have the same width.

The MTF target patterns 302A and 302B differ from the MTF target patterns 302C and 302D in that the former have a higher lines-per-inch frequency than the latter, such that the latter has wider lines than the former. The MTF target patterns 302A and 302B differ from one another in that the former has its lines running vertically, whereas the latter has its lines running horizontally. Likewise, the MTF target patterns 302C and 302D differ from one another in that the former has its lines running vertically, whereas the latter has its lines running horizontally. It is noted that while the high-frequency target patterns 302A and 302B are ordered before the low-frequency target patterns 302C and 302D, in another embodiment the order may be reversed. More generally, the order in which the target patterns 302 are printed is not limited by embodiments of the invention.

The MTF target patterns 302 may be defined by their lines being generated to have a mean thickness matching that predicted by the following lines-per-inch definition:

$$\text{Line thickness} = \frac{\text{resolution}}{2 \times \text{lines per inch}}. \quad (1)$$

In this definition, resolution is the dots-per-inch or pixels-per-inch resolution of the printing device printing the MTF target patterns 302. For example, a seventy lines-per-inch pattern generated at six-hundred dots per inch have lines with thickness of $$\frac{600}{2 \times 70},$$

or 4.286 pixels. Because lines usually have to be defined in integer multiples of pixels, a cumulative residual may be tracked, and when the residual meets or exceeds one, an extra pixel added to the thickness of the next line.

The sequence 300 of the MTF target patterns 302 is for exemplary purposes only. In actuality, where series of black-and-white parallel straight lines are employed for an MTF target pattern, the lines-per-inch frequencies typically are measured in the tens to the hundreds. The lines of an MTF target pattern may alternatively be dark and light instead of black and white. The lines of an MTF target pattern may also alternatively be concentric annular lines, instead of parallel straight lines. A given MTF target pattern may measure less than one inch-by-one inch. Other embodiments of the invention are amenable to other modifications to the exemplary MTF target patterns 302 of FIG. 3.

The sequence 300 of the MTF target patterns 302 is employed to measure an MTF of the quality of a reading device, such as an optical scanning device or other capturing device, relative to the MTF target patterns 302 being printed on a printing medium by a printing device, such as a laser or ink-ejection printing device. In particular, the MTF measures a reading device's ability to discern high frequency black-to-white transitions. Generally, a number of sequences of MTF target patterns, such as the sequence 300 of the MTF target patterns 302, are employed to measure the quality of a reading device, where different sequences have different low-frequency MTF target patterns and different high-frequency target patterns. The correspondingly determined MTF values for the reading device in relation to these different sequences can then be compared against specified MTF values, to determine whether the reading device is able to properly distinguish between black and white within specifications.

The low-frequency MTF target patterns 302C and 302D may thus be of sufficiently low frequency that the reading device in question is able to detect completely true black points within the black lines, and able to detect completely true white points within the white lines. The high-frequency MTF target patterns 302A and 302B may thus be of sufficiently high frequency that the reading device in question is unable to detect true black points within the black lines, and is unable to detect true white points within the white lines. For a given combination of a particular reading device reading the MTF target patterns 302 and a particular printing device printing the MTF target patterns 302, these low and high frequencies can vary.

As ambiguous target elements in a value-based embodiment, each of the MTF target patterns 302 has a number of different lines per inch (LPI) values that correspond to the different manners by which the MTF target pattern in question can be interpreted. For example, a low-frequency MTF target pattern may have the two LPI values {20, 21}, and another low-frequency MTF target pattern may have the two LPI values {23, 24}. Assuming, that the reading device 302 can properly read a low-frequency LPI value with an error less than one LPI, the separation of the LPI values of these two MTF target patterns by no less than two LPI sufficiently ensures that the reading device 302 properly reads an low-frequency MTF target pattern printed at a given LPI. For example, if the reading device 302 reads the 21 LPI value of an MTF target pattern as 21.99 LPI, because the device 302 knows that no MTF target pattern exists with an LPI value of 22, then the device 302 properly concludes that the proper LPI value is 21, due to the relative groupings of the LPI values, such that the values {20, 21} are numerically closer to each other than they are to the values {23, 24}.

As in the general value-based embodiment, the different LPI values of each of the MTF target patterns 302 are near one another according to a predetermined measure. In the example of the previous paragraph, for instance, where each MTF target pattern has two LPI values, the LPI value at which the MTF target pattern is one LPI away from the other LPI value of this MTF target pattern. Thus, the LPI values of a given MTF target pattern are one LPI away from one another. Furthermore, the LPI values of a given MTF target pattern are at least two LPI away from the LPI values of another MTF target pattern.

Similarly, the authentication signature in the specific value-based embodiment that employs MTF target patterns specifies the LPI values at which the MTF target patterns are to be interpreted. For example, where a given low-frequency MTF target pattern has the two LPI values {20, 21}, one of these LPI values is selected as the LPI value at which this MTF target pattern is to be interpreted, such as 21. Regardless of whether the reading device 102 reads the LPI value 20 or 21, it interprets this LPI value as 21, therefore specifying this MTF target pattern. The authentication signature specifying a particular LPI value for each MTF target pattern corresponds to the manner by which the MTF target pattern in question is interpreted.

For quality assurance purposes, the MTF target patterns are typically printed on a printing medium as sequences of MTF target patterns, such as the sequence 300, where each sequence includes a high-frequency horizontal MTF target pattern, a high-frequency vertical target pattern, a low-frequency horizontal pattern, and a low-frequency vertical pattern. If the MTF target patterns printed will be used just for authentication purposes, and not for quality assurance purposes, then printing the MTF target pattern in these sorts of sequences is not necessary. Just a single horizontal or vertical MTF target pattern, at high or low frequency, can serve as an ambiguous target pattern in a specific value-based embodiment of the invention.

By comparison, where the MTF target patterns printed will be employed both for quality assurance purposes and for authentication purposes, it is desirable to maintain such sequences of MTF target patterns. However, while all four MTF target patterns of each sequence may be used for quality assurance purposes, not all of the target patterns and not all of the sequences have to be used for authentication purposes. It may be decided a priori which target patterns and which sequences to employ for authentication purposes, such that the identification of these target patterns and sequences serves as an added authentication feature. That is, a counterfeiter may not know which MTF target patterns are being specifically read for authentication.

Figure 4:
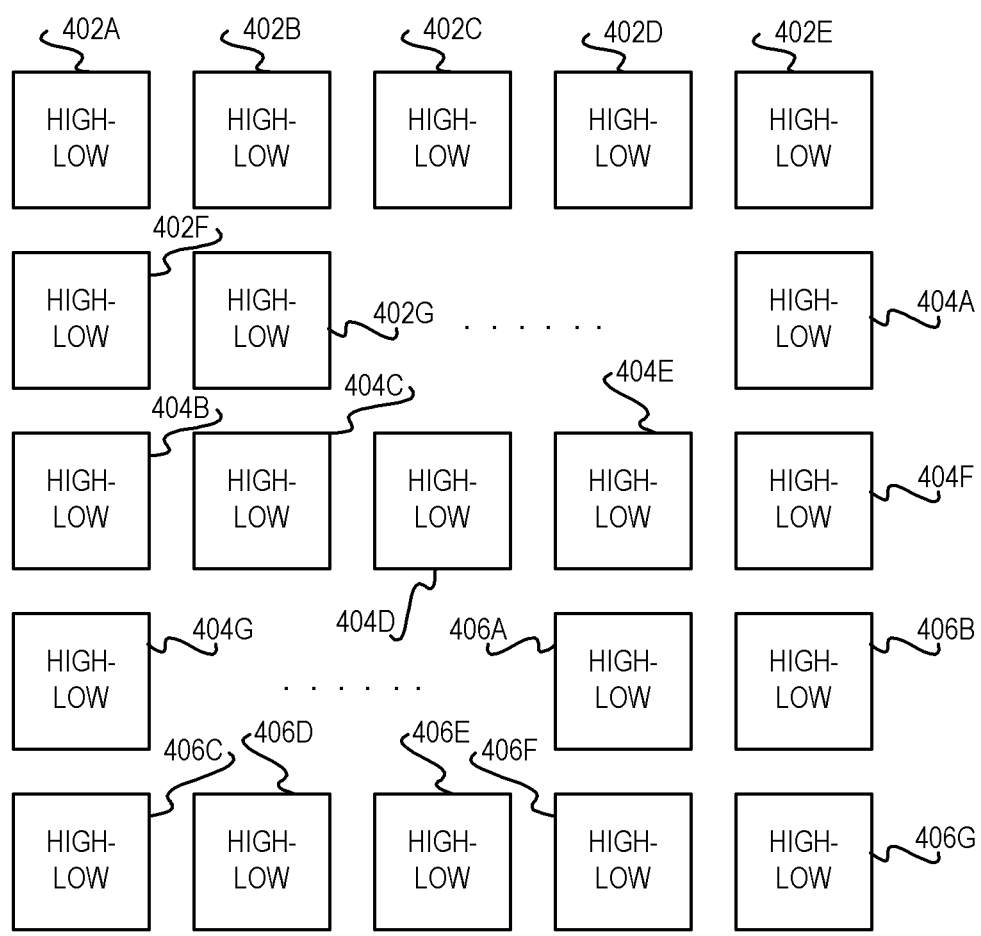

For instance, FIG. 4 shows some of the MTF target patterns that are all used for quality assurance, but that may not all be used for authentication according to an embodiment of the invention. These MTF target patterns include one or more high frequency-low frequency MTF target pattern pairs 402A, 402B, 402C, 402D, 402E, and 402F, collectively referred to as the high frequency-low frequency MTF target pattern pairs 402, where each of the pairs 402 can include one or more high-frequency MTF patterns and one or more low-frequency MTF patterns. For example, the pairs 402A may correspond to the sequence of MTF target patterns 300 of FIG. 3, and thus include the high frequency-low frequency pair of MTF patterns 302A and 302C and the high frequency-low frequency pair of MTF patterns 302B and 302D.

Likewise, the MTF target patterns selected for quality assurance purposes include in FIG. 4 one or more high frequency-low frequency MTF target pattern pairs 404A, 404B, 404C, 404D, 404E, and 404F, collectively referred to as the high frequency-low frequency MTF target pattern pairs 404. The MTF target patterns selected for quality assurance purposes further include the high frequency-low frequency MTF target pattern pairs 406A, 406B, 406C, 406D, 406E, and 406F, collectively referred to as the high frequency-low frequency MTF target pattern pairs 404. Now, in one embodiment, all of the MTF target patterns selected for quality assurance purposes are also employed for authentication purposes, and thus all of the MTF target pattern pairs 402, 404, and 406 are employed for both of these purposes.

However, in another embodiment, just some of the MTF target patterns selected for quality assurance purposes may be employed for authentication purposes as well. The authentication sequence of the MTF target patterns employed for security authentication purposes may be determined as the pairs 402A, 402D, 402F, 402G, 404B, 404C, 404D, 404G, 406A, 406D, 406E, and 406F, as one arbitrary example. Thus, the selection of the sequence of MTF target patterns for authentication may specify an arbitrary sequence of the MTF target patterns for quality assurance. Furthermore, not all of the MTF target patterns of any given pair have to be used for authentication purposes.

In addition, in one embodiment, the MTF target patterns selected for quality assurance purposes may be mutually exclusive with those employed for authentication purposes. As an example using the MTF target pattern pairs 402, 404, and 406 of FIG. 4, for instance, the MTF target pattern pairs 402 and 404 may be selected or determined for quality assurance purposes. The MTF target pattern pairs 406 may then be selected or determined for authentication purposes.

Axis-based Embodiment in General

In this section of the detailed description, what is referred to as an axis-based embodiment of the invention is described generally. An axis-based embodiment of the invention employs ambiguous target elements that each can be interpreted by using a number of different axes. The different axes by which a given ambiguous target element can be interpreted correspond to the different manners by which the element can be interpreted, as one way to define the term "ambiguous target element" and the phrase "different manners by which an ambiguous target element can be interpreted."

Figure 5:
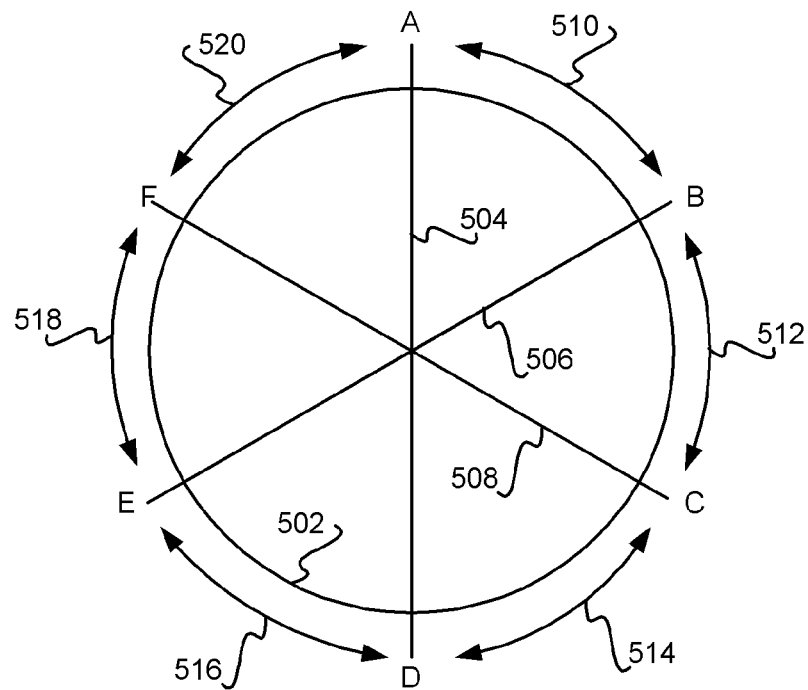
FIG. 5 is a diagram of a circle over which different values can be mapped therearound and through which a number of equally spaced axes intersect, according to a general axis-based embodiment of the invention.

FIG. 5 shows a circle 502 over which different values can be mapped around the circumference thereof, according to an embodiment of the invention. The circle 502 is intersected by three equally spaced axes 504, 506, and 508, such that the axes 504, 506, and 508 divides the circle 502 into six slices measuring sixty-degrees each. The axis 504 pairs the value A on one side of the circle 502 with the value D on the opposite side of the circle 502. The axis 506 pairs the value B on one side of the circle 502 with the value E on the opposite side of the circle 502. The axis 508 pairs the value C on one side of the circle 502 with the value F on the opposite side of the circle 502.

The slice of the circle 502 between the values A and B include the values from A to B on the corresponding periphery of the circle 502, as indicated by the arrow 510. The slice of the circle 502 between the values B and C include the values from B to C on the corresponding periphery of the circle 502, as indicated by the arrow 512. The slice of the circle 502 between the values C and D include the values from C to D on the corresponding periphery of the circle 502, as indicated by the arrow 514. The slice of the circle 502 between the values D and E include the values from D to E on the corresponding periphery of the circle 502, as indicated by the arrow 516. The slice of the circle 502 between the values E and F include the values from E to F on the corresponding periphery of the circle 502, as indicated by the arrow 518. Finally, the slice of the circle 502 between the values F and A include the values from F to A on the corresponding periphery of the circle 502, as indicated by the arrow 520.

An ambiguous target element can be printed at any of the values represented by the circumference of the circle 502. The ambiguous target element further can be interpreted by any of the axes 504, 506, and 508. For each ambiguous target element, therefore, the authentication signature specifies a particular axis by which the ambiguous target element is to be interpreted. An authentication fingerprint thus corresponds to a given axis by which an ambiguous target element is to be interpreted.

For example, an ambiguous target element is considered that is printed at the value E on the circle 502. The ambiguous target element can be interpreted by any of the axes 504, 506, and 508. The authentication signature may particularly specify that the axis 504 having the end values A and D be employed to interpret this ambiguous target element. As such, when the reading device 102 reads the value E of this ambiguous target element, the device 102 can interpret the value E as the value D, which is the value of the axis 504 that is closest to the value E. The reading device 102 reports this value D to the authentication device 104. Alternatively, the reading device 102 may simply report the axis 504 having the end values A and D to the authentication device 104. If the authentication signature 128 at the authentication device 104 also stores the axis 504 for this ambiguous target element, then authentication as to this element is successful.

It is noted that this approach is useful even where the reading device 102 is not able to read the printed value of an ambiguous target element with great precision. For instance, the reading device 102 may actually detect the printed value E of an ambiguous target element as the value F instead of as the value E. However, because this value F is nevertheless interpreted by the reading device 102 using the axis 504, such that the value A is returned to the authentication device 104 for the ambiguous target element, authentication of this ambiguous target element can still be successful. That is, the authentication device 104 may not look to the particular value returned by the reading device 102, but whether the returned value is one of the two end values of the correct axis in question. In this example, for instance, even if the reading device 102 should have returned the value D for the printed value E of an ambiguous target element when using the axis 504, because it returned the other value of the axis 504—the value A—the authentication device 104 still considers the device 102 as being successfully authenticated as to this ambiguous target element.

In one embodiment, the values A, C, and E of the circle 502 may be considered one type of value, whereas the values B, D, and F of the circle 502 may be considered another type of value. For descriptive convenience and clarity, the values A, C, and E are referred to as first values, and the values B, D, and F are referred to as second values. Reference to a particular value as either a first value or a second value does not imply, however, the value having any other aspect, quality, or property, and is used simply to differentiate the values A, C, and E from the values B, D, and F.

Now, each of the axes 504, 506, and 508 has both a first value and a second value. The axis 504, for example, has the first value A and the second value D. Therefore, the three values at which a given ambiguous target element can be printed, where the ambiguous target element is interpreted as a given end value of a given axis, can be described as follows. One of these three values is the given end value of the given axis itself. Where this value is the first value of the given axis, then the other two of these three values are the second values of the other two axes. Where this value is the second value of the given axis, then the other two of these three values are the first values of the other two axes.

Figure 6:
FIG. 6 is a diagram of an authentication target having a number of ambiguous target elements, according to a general axis-based embodiment of the invention.

FIG. 6 shows an authentication target 600 that can be authenticated in accordance with an axis-based authentication approach, according to an embodiment of the invention. The authentication target 600 includes a number of ambiguous target elements 602A, 602B, . . . , 602N, collectively referred to as the ambiguous target elements 602. Each of the ambiguous target elements 602 can be interpreted using the axes 504, 506, and 508. Furthermore, each of the ambiguous target elements 602 is printed on a printing medium at a value that is mapped over the circumference of the circle 502.

The authentication signature for the authentication target 600 can specify a particular axis by which the reading device 102 is to interpret each of the ambiguous target elements 602 of the target 600. For instance, the ambiguous target element 602A may be specified within the authentication signature as to be interpreted using the axis 504, the ambiguous target element 602B may be specified within the signature as to be interpreted using the axis 508, and so on. In one embodiment, like values at which different ambiguous target elements 602 are printed may nevertheless be associated with different axes within the authentication signature for interpretation.

Thus, for authentication, the reading device 102 reads the value of each ambiguous target element of the authentication target 600, and interprets the value using the axis specified within the authentication signature for that ambiguous target element. The reading device 102 then reports the closest value on the axis to the printed value read for a given ambiguous target element to the authentication device 104. Alternatively, the reading device 102 may simply report the axis as a whole. The authentication device 104 then compares the reported value or axis for the given ambiguous target element with the expected axis as stored in the authentication signature 128 at the device 104. If the reported value or the reported axis matches the expected axis, then authentication is considered successful as to that ambiguous target element.

Specific Axis-based Embodiment Using Color Axis

In this section of the detailed description, exemplary color targets are described. A number of these color targets can be employed as the ambiguous target elements of an authentication target in the axis-based embodiment that has been described, as particularly a color axis-based embodiment. The color axis-based embodiment is specifically useful because the color targets may be used for quality assurance purposes as well as for authentication purposes, as will be described.

Figure 7:
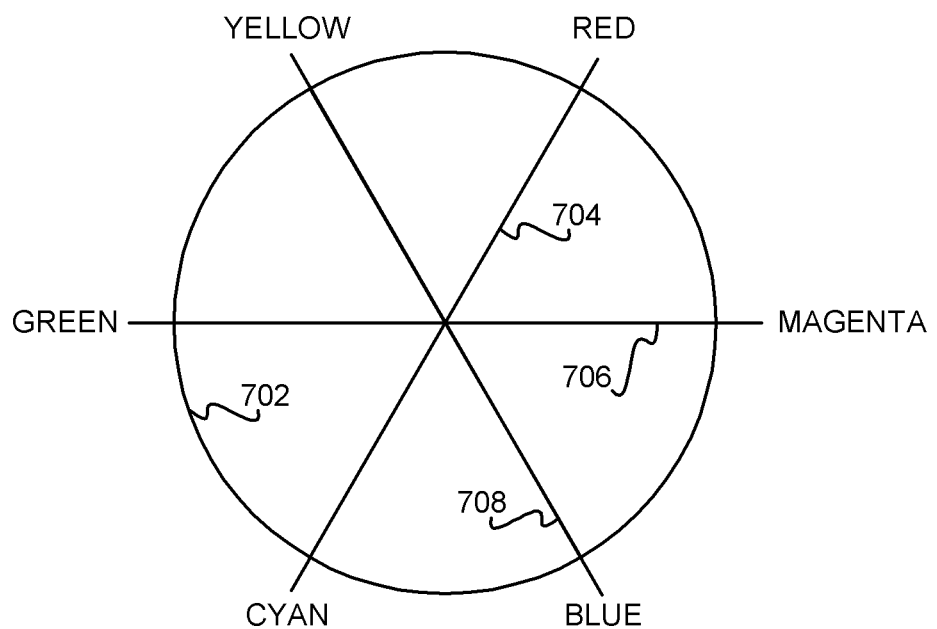
FIG. 7 is a diagram of a color wheel, according to a specific color axis-based embodiment of the invention.

FIG. 7 shows a color wheel 702 over which six particular colors, or hues, are mapped, according to an embodiment of the invention. The color wheel 702 includes the primary additive colors red, green, and blue, as well as their corresponding subtractive, or printing, colors cyan, magenta, and yellow, respectively. The axes 704, 706, and 708 each pair a primary additive color with its opposite and corresponding subtractive color. Thus, the axis 704 pairs red with cyan, the axis 706 pairs magenta with green, and the axis 708 pairs blue with yellow. The color wheel 702 may be considered as a specific embodiment of the circle 502 of FIG. 5 that has been described.

A number of color targets may be printed on a printing medium, where each color target is printed with one of the six colors of the color wheel 702, or, in another embodiment, with any of the colors represented by the color wheel 702. For instance, the segment of the wheel 702 between red and magenta defines colors between these two colors, the segment of the wheel 702 between magenta and blue defines colors between these two colors, and so on. An example of such a number of color targets is the authentication target 600 of FIG. 6 that has been described, where each of the ambiguous target elements 602 is a color target printed in one of the colors of the color wheel 702.

In the first instance, such a number of color targets are useful for quality assurance purposes, as can be appreciated by those of ordinary skill within the art. For example, the color targets can be employed to ensure that a given combination of a particular reading device reading the color targets and a particular printing device printing the color targets properly yields all the colors of the color wheel 702. A large number of such color targets in different colors of the color wheel 702 may therefore be printed by a given printing device, and then read by a given reading device. If the colors match the expected colors within some degree of precision, then it can be said that this given combination of a reading device and a printing device is properly color calibrated.

In the second instance, however, a number of color targets can also be used for authentication purposes. As in the general axis-based embodiment, each of the color targets is an ambiguous target element that can be interpreted in relation to a number of different axes, specifically the axes 704, 706, and 708. Furthermore, for each color target, an authentication signature specifies which axis is to be used to interpret the color target.

For example, a color target serving as an ambiguous target element may be printed in green. The color signature may further interpret this color target using the green-magenta axis 706. The authentication signature may particularly specify the green color of this axis 706, or the signature may generally specify the axis 706 as a whole. Upon reading this color target, the reading device 102 interprets the color green as the color green of the axis 706, and reports this color to the authentication device 104. Alternatively, the reading device 102 may just report the green-magenta axis 706 itself. In either case, the authentication device 104 determines whether the color reported or the color axis reported matches the color axis stored for this ambiguous target element within the authentication signature 128 stored at the device 104.

As with the MTF target patterns in the specific value-based embodiment, not all the color targets have to be used for both authentication and quality assurance purposes. For a large number of such color targets, all of the color targets may be employed for quality assurance purposes, for instance, and just some of the color targets may be employed for authentication purposes. Alternatively, different color targets may be employed for quality assurance purposes as compared to those employed for authentication purposes. In this latter embodiment, the color targets employed for quality assurance purposes are thus mutually exclusive with those employed for authentication purposes. Furthermore, the color targets may be used for branding purposes, as color barcodes for tracking and tracing purposes, as well as other purposes in addition to authentication purposes.

Concluding Method

FIG. 8 shows a method 800 for authenticating the reading device 102, by the authentication device 104, in relation to the authentication target 108 having the ambiguous target elements 110, according to an embodiment of the invention. The method 800 is amenable to implementation in relation to the general or specific value-based embodiments that have been described, as well as to implementation in relation to the general or specific axis-based embodiments that have been described. Parts of the method 800 are performed by the reading device 102, and other parts are performed by the authentication device 104, as denoted in FIG. 8. Furthermore, at least some parts of the method 800 may be implemented as one or more computer programs stored on a tangible computer-readable medium.

The reading device 102 reads the ambiguous target elements 110 of the authentication target 108 printed on the printing medium 106 (702). The ambiguous target elements 110 are ambiguous in that each ambiguous target element can be interpreted in one of a number of different manners. The reading device 102 further interprets the ambiguous target elements in accordance with the authentication signature 118 at the reading device 102 (706). As has been noted, the authentication signature 118 may be effectively, inherently, or implicitly generated from the authentication fingerprint 120 in one embodiment.

As has also been noted, the reading and interpretation process performed by the reading device 102, such as in parts 802 and 804 of the method 800, may be simply referred to as the reading device 102 reading the ambiguous target elements 110 of the authentication target 108. That is, the reading device 102 reading and then interpreting the ambiguous target elements 110 of the authentication target 108 is synonymous with the reading device 102 simply reading the elements 110 of the target 108, in that such reading as denoted herein encompasses the reading device 102 also interpreting the elements 110 of the target 108 in accordance with the authentication signature 118. Data representing the ambiguous target elements 110 as read (and interpreted) by the reading device 102 is then sent to the authentication device 104 (706), which receives this data (708).

The authentication device 104 compares the ambiguous target elements as read (and interpreted) by the reading device 102 against the expect manners of interpretation for these ambiguous target elements as stored in the authentication signature 128 at the authentication device 104 (710). That is, it is said that the authentication signature 128 specifies, stores, has, or includes, for each ambiguous target element, the expected manner by which the ambiguous target element is to be interpreted, as one of the number of different manners by which the element can be interpreted. If the ambiguous target elements as read (and interpreted) by the reading device 102 match this authentication signature 128, then authentication of the reading device 102 is successful, and otherwise is unsuccessful. That is, if for each ambiguous target element the reading device 102 interpreted the ambiguous target element in the expected manner specified by the authentication signature 128 at the authentication device 104, then authentication of the reading device 102 is successful, and otherwise is unsuccessful.

Where authentication is unsuccessful, the authentication device 104 signals that the reading device 102 has failed authentication (712). Furthermore, at the authentication device 104 itself, a user thereof may be alerted to this authentication failure, or the authentication failure may be logged. Conversely, where authentication is successful, the authentication device 104 signals that the reading device 102 has passed authentication (714), such as in a similar way at the authentication device 104 as in the case where authentication is unsuccessful. In either case, the authentication device 104 may signal whether the reading device 102 has passed or failed authentication by appropriate signaling to the reading device 102. Additionally or alternative, the authentication device 104 may signal a user of the authentication device 104 itself as to whether the reading device 102 has passed or failed authentication. For instance, a security provider may wish to know whether the reading device 102 is operating with an incorrect authentication signature, such as one that has been assigned to a different device, one that has been stolen, or one that is being used in the wrong location (i.e., and thus has been diverted).

Furthermore, the authentication device 104 may change the authentication signature 128 or the authentication fingerprint 120 for the reading device 102, and send this new authentication signature 128 to the reading device 102 to store as the new authentication signature 118, or send this new authentication fingerprint 120 to the reading device 102 for storage thereat (716). Therefore, the reading device 102 may receive and display the signaling that may be sent by the authentication device 104 as to authentication of the reading device 102 (718). For example, the reading device 102 may alert the user of the device 102 as to whether the device 102 has passed or failed authentication. If the reading device 102 also receives a new authentication fingerprint or a new authentication signature, then the reading device 102 further stores this new fingerprint or new signature as the new authentication fingerprint 120 or as the new authentication signature 118, respectively (718).

The changing of the authentication signature or of the authentication fingerprint may be achieved on a periodic basis other than that described in FIG. 8. That is, the authentication signature or the authentication fingerprint is depicted in FIG. 8 as being changed after the reading device 102 has been successfully authenticated. Alternatively, the authentication signature or the authentication fingerprint may be changed at a different time, but still on a periodic basis.

Changing the authentication signature or the authentication fingerprint on a periodic basis is advantageous, in that doing so adds an extra layer of ambiguity into the authentication process that makes counterfeiting even more difficult by unscrupulous parties. In particular, periodically changing the authentication signature or the authentication fingerprint is itself ambiguous, in that it cannot be guaranteed that the correct authentication signature or fingerprint today will be correct tomorrow. Such periodic changing thus presents a moving target to potential counterfeiters. Even if they successfully counterfeit the process by which the reading device 102 is authenticated today, the authentication of the reading device 102 as counterfeited may not pass authentication tomorrow, for instance.

Low-resolution images may also be sent along with the new authentication signature from the authentication device 104 to the reading device 102 for reading and reporting thereby. The correct or actual values of such images reported by the reading device 102 back to the authentication device 104 may not be as important as the axes, for instance (i.e., the particular manners of interpretation of these images). Therefore, the fact that these images are of low resolution is not important. Moreover, since the images do not have to be of high resolution, and they can be transmitted to and stored at the reading device 102 in a low-bandwidth and low-storage requirement manner.

We claim:

1. A method comprising:
   a reading device reading a plurality of ambiguous target elements of an authentication target printed on a medium, each ambiguous target element having a plurality of different manners by which the ambiguous target element can be interpreted by the reading device;
   comparing the authentication target as read by the reading device against an authentication signature of the reading device, the authentication signature specifying for each ambiguous target element an expected manner by which the reading device interprets the ambiguous target element as one of the different manners by which the ambiguous target element can be interpreted; and,
   where the authentication target as read by the reading device matches the authentication signature of the reading device, signaling that the reading device has passed authentication.

2. The method of claim 1, further comprising where the authentication target as read by the reading device does not match the authentication signature of the reading device, signaling that the reading device has failed authentication.

3. The method of claim 1, wherein for each ambiguous target element of the authentication target that is unique, the reading device is to employ a same expected manner to interpret the ambiguous target element, an authentication fingerprint of the reading device defining the same expected manners by which the reading device is to interpret the ambiguous target elements that are unique.

4. The method of claim 3, further comprising periodically changing the authentication fingerprint of the reading device, such that the reading device can differently interpret each ambiguous target element of the authentication target after the authentication fingerprint of the reading device has changed.

5. The method of claim 1, wherein each ambiguous target element is printed at an actual value that is one of a plurality of values of the ambiguous target element, the values corresponding to the different manners by which the ambiguous target element can be interpreted,
   wherein other of the values of the ambiguous target element are near the actual value at which the ambiguous target element is printed according to a predetermined measure.

6. The method of claim 5, wherein the values of each ambiguous target element are selected from a plurality of possible values, such that one or more of the possible values are absent from the values of the ambiguous target elements as a whole.

7. The method of claim 5, wherein, for each ambiguous target element, the authentication signature specifies an expected value from the reading device for the ambiguous target element as one of the values of the ambiguous target element, as the expected manner by which the reading device interprets the ambiguous target element.

8. The method of claim 1, wherein the ambiguous target elements of the authentication target comprise a plurality of modulation transfer function (MTF) target patterns, each MTF target pattern having a plurality of lines-per-inch (LPI) values,
   such that each MTF target pattern is printed at an actual LPI value that is one of the LPI values of the MTF target pattern, and
   such that other of the LPI values of the MTF target pattern are near the actual LPI value at which the MTF target pattern is printed according to a predetermined measure.

9. The method of claim 8, wherein, for each MTF target pattern, the authentication signature of the reading device specifies an expected LPI value from the reading device for the MTF target pattern as one of the LPI values of the MTF target pattern.

10. The method of claim 1, wherein each ambiguous target element has a printed value, the printed value capable of being interpreted in relation to a plurality of axes, and
    wherein, for each ambiguous target element, the authentication signature specifies a selected axis by which the reading device is expected to interpret the printed value of the ambiguous target element.

11. The method of claim 1, wherein the ambiguous target elements of the authentication target comprise a plurality of color targets, each color target having a printed color, the printed color capable of being interpreted in relation to a plurality of color axes, each color axis pairing a primary additive color and a corresponding subtractive color, where the authentication signature specifies a selected color axis from the plurality of axes by which the reading device is expected to interpret the printed color.

12. The method of claim 11, wherein, for each color target, the selected color axis by which the reading device is expected to interpret the printed color of the color target specifies a plurality of colors encompassing the printed color of the color target and including:
    one of the primary additive color and the corresponding subtractive color of the selected color axis by which the reading device is expected to interpret the printed color of the color target;
    where the colors include the subtractive color of the selected color axis, the additive colors of the color axes other than the selected color axis; and,
    where the colors include the primary additive color of the selected color axis, the subtractive colors of the color axes other than the selected color axis.

13. The method of claim 1, further comprising periodically changing the authentication signature of the reading device, such that the reading device can return a different expected value for each ambiguous target element of the authentication target after the authentication signature of the reading device has changed.

14. The method of claim 13, wherein the authentication signature of the reading device is changed upon the reading device having passed authentication.

15. A computer-readable medium having a computer program stored thereon to perform a method comprising:
    receiving from a reading device a plurality of ambiguous target elements of an authentication target printed on a printing medium as read by the reading device, each ambiguous target element having a plurality of different manners by which the ambiguous target element can be interpreted by the reading device;
    comparing the authentication target as read by the reading device against an authentication signature of the reading device, the authentication signature specifying an expected manner for each ambiguous target element by which the reading device interprets the ambiguous target element as one of the different manners by which the ambiguous target element can be interpreted;
    where the authentication target as read by the reading device matches the authentication signature of the reading device, sending to the reading device an indication that the reading device has passed authentication; and,
    otherwise, sending to the reading device an indication that the reading device has failed authentication.

16. The computer-readable medium of claim 15, wherein, each ambiguous target element is printed at an actual value that is one of a plurality of values of the ambiguous target element, the values corresponding to the different manners by which the ambiguous target element can be interpreted, and
  wherein, for each ambiguous target element, the authentication signature specifies an expected value from the reading device for the ambiguous target element as one of the values of the ambiguous target element, as the expected manner by which the reading device interprets the ambiguous target element.

17. The computer-readable medium of claim 15, wherein each ambiguous target element has a printed value, the printed value capable of being interpreted in relation to a plurality of axes, and
  wherein, for each ambiguous target element, the authentication signature specifies a selected axis by which the reading device is expected to interpret the printed value of the ambiguous target element.

18. The computer-readable medium of claim 15, further comprising, where the authentication target as read by the reading device matches the authentication signature of the reading device:
  changing the authentication signature of the reading device, such that the reading device can return a different expected value for each ambiguous target element of the authentication target after the authentication signature of the reading device has changed; and,
  sending the reading device the authentication signature as has been changed.

19. A reading device comprising:
  a reading mechanism to read a plurality of ambiguous target elements of an authentication target printed on a printing medium, each ambiguous target element having a plurality of different manners by which the ambiguous target element can be interpreted by the reading device;
  a computer-readable medium storing an authentication signature of the reading device specifying a manner for each ambiguous target element by which the reading mechanism is to interpret the ambiguous target element as one of the different manners by which the ambiguous target element can be interpreted; and,
  a communication mechanism to send to an authentication device the ambiguous target elements of the authentication target as has been read by the reading mechanism in accordance with the authentication signature, and to receive from the authentication device whether the reading device has passed or failed authentication, based on whether the authentication target as read by the reading mechanism matches the authentication signature of the reading device as stored at the authentication device.

20. The reading device of claim 19, wherein one of:
  each ambiguous target element is printed at an actual value that is one of a plurality of values of the ambiguous target element, the values corresponding to the different manners by which the ambiguous target element can be interpreted, and, for each ambiguous target element, the authentication signature specifies an expected value from the reading device for the ambiguous target element as one of the values of the ambiguous target element, as the expected manner by which the reading device interprets the ambiguous target element; or,
  each ambiguous target element has a printed value, the printed value capable of being interpreted in relation to a plurality of axes, and, for each ambiguous target element, the authentication signature specifies a selected axis by which the reading device is expected to interpret the printed value of the ambiguous target element.

* * * * *